Patented Sept. 25, 1945

2,385,438

UNITED STATES PATENT OFFICE 2,385,438

STARCH PRODUCT

George B. Fowler and Donald K. Pattilloch, Springfield, Mass.; said Pattilloch assignor to Chemical Development, Inc., Chicago, Ill., a corporation of Illinois No Drawing. Application September 27, 1941, Serial No. 412,605

5 Claims. (Cl. 260—9)

The present invention relates to an improved form of starch product, characterized by being in the form of a tough colloidal material containing relatively large amounts of water and of a nature particularly adapted to becoming incorporated with paper-making fibers, as in a beater, and then being retained in the subsequent steps of sheet formation from the resulting furnish. It comprises an apparent reaction product or condensation product of starch, a urea-formaldehyde resin containing a high proportion of formaldehyde groups, and an alkaline material, preferably a silicate having an $M_2O$ to $SiO_2$ ratio of at least 1:1, such for example as sodium metasilicate or sodium sesquisilicate. In a lesser degree, free sodium hydroxide may be employed to effect the reaction.

The product of the present invention may, for instance, be prepared by reacting equal parts, by weight, of starch and a water-dispersible type of urea-formaldehyde condensation product in the presence of an alkaline medium. If, for example, 40 parts by weight of dry starch and 50 parts by weight of a urea-formaldehyde condensation product in the form of an aqueous dispersion containing about 70% of solids are suspended in 480 parts by weight of water and there are then added to the resulting mixture 28 grams of sodium metasilicate pentahydrate ($Na_2SiO_3.5H_2O$) dissolved in 120 parts of water, there will be produced, in a few minutes, an exceedingly tough, whitish, almost opaque gel, which, on standing, rapidly becomes tougher, and upon storage for some hours becomes practically insoluble in water. The water contained in the gel is so firmly held that it can scarcely be expelled therefrom, and the gel acts very much like rubber.

It appears that after a time the reaction comes to an equilibrium, and further storage does not appreciably change the product. It stores well and shows no tendency to decompose or sour. The method of addition of the reagents may be reversed, with similar results. Thus when 50 grams of the above-mentioned urea-formaldehyde condensation product, containing 70% of solids, are dispersed in 480 grams of water and 28 grams of sodium metasilicate, the latter dissolved in 120 grams of water, are mixed together and stirred, no appreciable action takes place. If then 40 grams of dry starch, such as potato starch, are added to the mixture and uniformly distributed therein by stirring, the mixture will gradually thicken. After about 20 minutes it will be almost too thick to stir, and it may then be allowed to age. After a few hours it will be found to have about the same characteristics as the first-mentioned mixture.

In mixing the materials according to the method first described, care should be taken to effect a thorough distribution of the insoluble starch granules in the water, and the sodium metasilicate solution must be quite rapidly poured into the starch suspension with violent agitation in order to insure adequate mixing before the gelation starts, as otherwise the mixture will be too stiff to stir. From a commercial point of view, and when mixing large quantities, the second method is perhaps the better of the two. Of course, the starch may be mixed with enough water to form a slurry and then poured into the solution already containing the metasilicate and the urea-formaldehyde condensation product.

The product obtained may be employed, for example, in paper making, by being distributed, in proper proportions, in a beater already containing paper fibers, whereafter the usual additions of alum, etc. may be made. Somewhat better results are, however, secured by first effecting the usual sizing of the fibers, thus providing an acid environment at the time the starch complex of the present invention is added. This will secure the further benefits of the formation of a precipitated envelope around the starch-complex particles, as a result of the reaction between the metasilicate and the alum that is in the beater, being left over from the setting of the size.

A urea-formaldehyde product that lends itself particularly well to the practice of the present invention is one commercially available in the form of an aqueous dispersion under the name of "Uformite 430," and which is prepared by the condensation of formaldehyde and urea with avoidance of the formation of any hydrophobe condensation product.

It is not known just what reactions take place in carrying out the present invention. Merely boiling the starch with the urea-formaldehyde condensation product will not yield the product of the present invention; but if a mixture of starch, water and the urea-formaldehyde condensation product is rendered strongly alkaline, as by the addition of sodium hydroxide, the reaction will take place. However, the product obtained by the use of an alkali silicate, such as sodium metasilicate or sesquisilicate, is quite superior to one made with sodium hydroxide.

When using sodium sesquisilicate, the amount used should be that yielding the same degree of alkalinity as the metasilicate. In general, metasilicate is preferable, as it is less expensive and somewhat less hygroscopic in storage, and hence easier to use.

In general, the water-soluble urea-formaldehyde condensation products will work satisfactorily. The partially cured, thermoplastic or thermosetting resinous hydrophobe products are not desirable for the present purpose.

The proportions of the materials can be considerably varied. Thus as little as ¼ of the weight of the urea-formaldehyde product can be used with 1 part of starch, the amount of sodium meta- or sesqui- silicate, however, remaining about the same; that is to say, enough of the silicate should be employed to secure a rapid gelatinization of the starch. The silicate sirups of commerce, such as those silicates containing less than one mol of sodium oxide to one mol of silica ($SiO_2$), are not suitable for the practice of the invention, as they will not gelatinize the starch unless first rendered sufficiently alkaline to do so.

The amount of the new product to be added to paper may be stated as amounting to about 3% to 10% on the weight of the paper. The results are a very great increase in the wet-strength of the paper and a marked increase in bursting strength as well.

All previous attempts to incorporate water-soluble urea-formaldehyde condensation products with a paper furnish have proved unsuccessful, as no way was known to insolubilize these condensation products in the presence of large amounts of water, and hence paper manufacturers have contented themselves with the use of the water-soluble urea-formaldehyde condensation products in the form of tub-size. By the use of the present invention, however, the incorporation of such products in the beater, or at least before sheet formation, becomes feasible for the first time. The importance of the invention can, therefore, be immediately appreciated.

The product, moreover, is, of course, useful for other purposes, such as an extremely tough adhesive, and as a base for color plates, as a clarifier for liquids, because of its entangling properties, and for any purpose where a tough starch product is required. For that reason all uses for which this product may find application are to be considered as within the scope of the present invention.

The starches found most suitable for the practice of the present invention are potato starch, tapioca starch, sago starch, cornstarch and wheat starch, in about the order mentioned; but all of them will yield valuable products.

For some purposes, a larger proportion of the urea-formaldehyde condensation product may be used, such as, for example, as much as 4 parts of the condensation product to 1 part of starch, this enabling the incorporation of relatively large amounts of the urea-formaldehyde product with the paper. On the other hand, just enough of the urea-formaldehyde condensation product may be used with a relatively large proportion of starch to toughen up the starch and to enable its better retention in the paper furnish.

It has already been proposed to use formaldehyde itself with starch. A gelation of starch and an equal weight of actual $CH_2O$ by means of sodium metasilicate, while yielding a starch paste which is precipitable in the beater by means of alum by reason of the presence of the silicate, does not possess either the opacity or the other characteristics of the product of the present invention. In fact, such a formaldehyde starch paste is transparent and yellow, while the present product is porcelain white and opaque.

It will, of course, be within the scope of the present invention to employ any suitable urea-formaldehyde condensation product, which might be in dry form, in solution or in the form of a colloidal dispersion or suspension. Such condensation products, in water-soluble or dispersible form, are at present commercially available under such trade names as "Uformite," "Rhotex," "Rhonite," and the like. Therefore, it is within contemplation of the inventors to produce dry mixtures of, say, starch, dry water-soluble or dispersible urea-formaldehyde resin, and an alkali metasilicate or sesquisilicate, in the general proportions hereinabove indicated, the said mixtures then being incorporated with the required amount of water to product the complex gels of the present invention.

Without in any way limiting the invention by the order of admixture or the precise proportions shown, what is claimed as new is:

1. Process of converting starch into a tough aqueous gel precipitable by aluminum sulfate which consists in suspending about 1 part of starch and from about ¼ to 4 parts of a water dispersible urea - formaldehyde condensation product in about 15 parts of water, and adding to the resulting suspension about 0.7 part of an alkali silicate from the group consisting of the metasilicates and the sesquisilicates whereby the starch is converted into said tough precipitable gel.

2. Process of making a tough starch gel precipitable by aluminum sulfate which consists in suspending about 40 parts of starch in about 480 parts of water containing about 50 parts by weight of a water-dispersible urea-formaldehyde condensation product, dissolving about 28 parts by weight of sodium metasilicate in 120 parts of water, and adding the latter solution rapidly to the former, with violent agitation.

3. A dry mixture capable when mixed with water of producing a tough aqueous starch gel containing urea-formaldehyde condensation products and which is precipitable from its aqueous solution by aluminum sulfate, consisting of substantial quantities each of starch and of a dry urea-formaldehyde condensation product dispersible in water in the proportions of about 1 part of starch to from ¼ to 4 parts of said condensation product, and about 0.7 part of an alkali silicate from the group consisting of metasilicate and sesquisilicate to gelatinize the starch substantially at room temperature on admixing said dry mixture with water in about the ratio of 15 parts of water to one part of the amount of starch contained in said mixture.

4. The dry mixture defined in claim 3 in which the alkali silicate is sodium metasilicate pentahydrate.

5. A dry mixture capable when mixed with water of producing a tough aqueous starch gel containing a water dispersible urea-formaldehyde condensation product, and which gel is precipitable by aluminum sulfate, consisting of about 40 parts of dry starch, 50 parts of a water dispersible urea-formaldehyde condensation product in dry form, and about 28 parts of sodium metasilicate pentahydrate.

GEORGE B. FOWLER.
DONALD K. PATTILLOCH.